US006102562A

United States Patent [19]

Bengtson

[11] Patent Number: 6,102,562

[45] Date of Patent: Aug. 15, 2000

[54] REMOVABLE CONTAINER INSERT

[75] Inventor: Eric Bengtson, San Luis Obispo, Calif.

[73] Assignee: Jenike & Johanson, Inc., Westford, Mass.

[21] Appl. No.: 09/305,095

[22] Filed: May 4, 1999

[51] Int. Cl.$^{7}$ ............................ B01F 13/00; B01F 15/02; B65G 11/20; B65D 88/28

[52] U.S. Cl. ....................... 366/341; 366/183.1; 193/2 R; 193/34; 222/460

[58] Field of Search .............................. 366/154.1, 158.1, 366/183.1, 183.2, 341; 193/2 R, 2 A, 33, 34, 217; 222/196, 181.3, 181.2, 181.1, 459, 460, 462

[56] References Cited

U.S. PATENT DOCUMENTS

| | | | |
|---|---|---|---|
| 1,218,250 | 3/1917 | Fox | 366/183.1 |
| 1,385,412 | 7/1921 | Williams et al. | 198/2 R |
| 1,668,825 | 5/1928 | Sobek | 198/2 R |
| 2,264,423 | 12/1941 | Wingenroth | 198/2 R |
| 2,671,647 | 3/1954 | Wolpert | 366/184 |
| 3,434,697 | 3/1969 | Carlson et al. | 366/189 |
| 4,282,988 | 8/1981 | Hulber, Jr. | 222/462 |
| 4,286,883 | 9/1981 | Johanson | 366/137 |
| 4,382,498 | 5/1983 | Glendinning | 193/34 |
| 4,408,889 | 10/1983 | Peschl | 366/341 |
| 4,560,285 | 12/1985 | Fisher | 366/341 |
| 4,702,364 | 10/1987 | Johanneck | 193/34 |
| 4,923,304 | 5/1990 | Jackson et al. | 366/184 |
| 5,123,749 | 6/1992 | Avery, Jr. | 366/341 |
| 5,248,197 | 9/1993 | Storf et al. | 366/341 |
| 5,277,492 | 1/1994 | Paul | 366/341 |
| 5,651,479 | 7/1997 | Bates | 222/196 |
| 5,769,281 | 6/1998 | Bates | 222/196 |

*Primary Examiner*—Tony G. Soohoo
*Attorney, Agent, or Firm*—Lahive & Cockfield, LLP

[57] ABSTRACT

An assembly providing a removable tapered insert for a particulate material container. A plurality of annularly spaced flat brackets are supported on and project inwardly of the container. The insert has tapered upper edge projections and is rotatable for vertical engagement with projections formed on the inner edges of the brackets. A cylindrical support ring may be provided to rest on notches formed on the inner edges of the brackets, and when fully assembled the insert may rest on the support ring for full annular support by the ring. Locking washers may be provided to prevent disengagement of the projections on the insert and brackets.

14 Claims, 4 Drawing Sheets

REMOVABLE CONTAINER INSERT

BACKGROUND OF THE INVENTION

This invention relates generally to the processing of particulate solids such as granular materials and powders. More particularly, it concerns the structures of hoppers and bins for the retention and dispensing of the solids in the course of industrial processing, storage and packaging.

Substantial knowledge has accumulated concerning the effects of hopper and bin geometry on the movement of mixtures of solids comprising both homogeneous and non-homogeneous compositions. For any type of mixture a condition of "mass flow" is generally desirable, that is, a condition in which all of the solids in the bin and/or hopper are in motion when any of the solids are being withdrawn at the outlet. For mixtures of particles of the same composition but of differing grain size, or mixtures of particles of differing compositions, it is also generally desirable to achieve and maintain a uniform distribution of particles of all sizes and compositions throughout the body of material.

In some applications a container such as a bin comprising or including a hopper and discharge device is a static component in a solids flow system. In other cases the container is filled, enclosed and rotated to tumble the contents to mix them. In some cases the same equipment may operate as a static component for certain applications and as a mixing tumbler for other applications.

For a given particulate material contained within a simple hopper with sloping walls, mass flow occurs if the slope of the walls relative to the vertical is less than an empirically observable, critical mass flow angle. In some cases, for example where there is limited available head room, the slope of the hopper wall may exceed that angle. However, as discussed in the U.S. Pat. No. 4,286,883 to Johanson mass flow can still be achieved by installing a conical insert coaxially within the hopper, allowing the solids to flow in the annular space between the hopper wall and the insert, provided that where the hopper and insert walls are opposing, i.e. at any horizontal plane intersecting both walls, the difference between their respective angles relative to the vertical is less than the critical mass flow angle, and in the case of an insert through which solids may also flow, further provided that the slope of the insert wall relative to the vertical is also less than the mass flow angle.

The installation of an insert within a hopper necessarily includes both the insert and the structural supports for the insert extending from the hopper wall. In some applications, particularly pharmaceutical processing, it is necessary to clean the interiors of bins and hoppers periodically, removing solids that may be retained within crevices, comers, depressions or the like, which may contaminate the solids in subsequent batches. If an insert is permanently fastened within a hopper cleaning may be significantly impeded by restricting access and impairing of visual inspection.

BRIEF SUMMARY OF THE INVENTION

In view of the foregoing, it is a principal object of this invention to provide apparatus that will enable a hopper or a bin having a hopper to be used either with an insert of the type described above or without an insert, depending on the type of solids being processed.

A second object is to provide apparatus including a removable insert that can be used either as a static solids retention and dispensing means or as a rotatable tumbler for the mixing and dispensing of particulate solids.

An additional object is to provide apparatus including a removable insert that permits thorough cleaning between processing operations with substantially no greater impairment than that associated with the cleaning of simple hoppers having no form of insert.

With the foregoing and other objects hereinafter appearing in view, the features of this invention reside in an assembly comprising a plurality of brackets supported on the wall of a container in annularly spaced arrangement and projecting inwardly toward a vertical axis, and an insert on the brackets having means for vertically engaging them. In the assembled position the brackets prevent the insert from being lifted therefrom during use.

A second feature is that a cylindrical support ring may be supported on the inner extremities of the brackets and the insert may be supported on the ring.

A third feature resides in the provision of tapered projections on the upper edge portion of the insert, adapted for engaging corresponding projections on the edges of the brackets by rotation of the insert relative to the brackets during installation.

Another feature resides in locking means to prevent the insert, once fully secured on the brackets, from being accidentally rotated relative thereto during use.

A further feature resides in the structural shapes of the respective components of the assembly, and particularly their accessibility for thorough cleaning between processing operations.

DETAILED DESCRIPTION OF THE INVENTION

Figure 1:
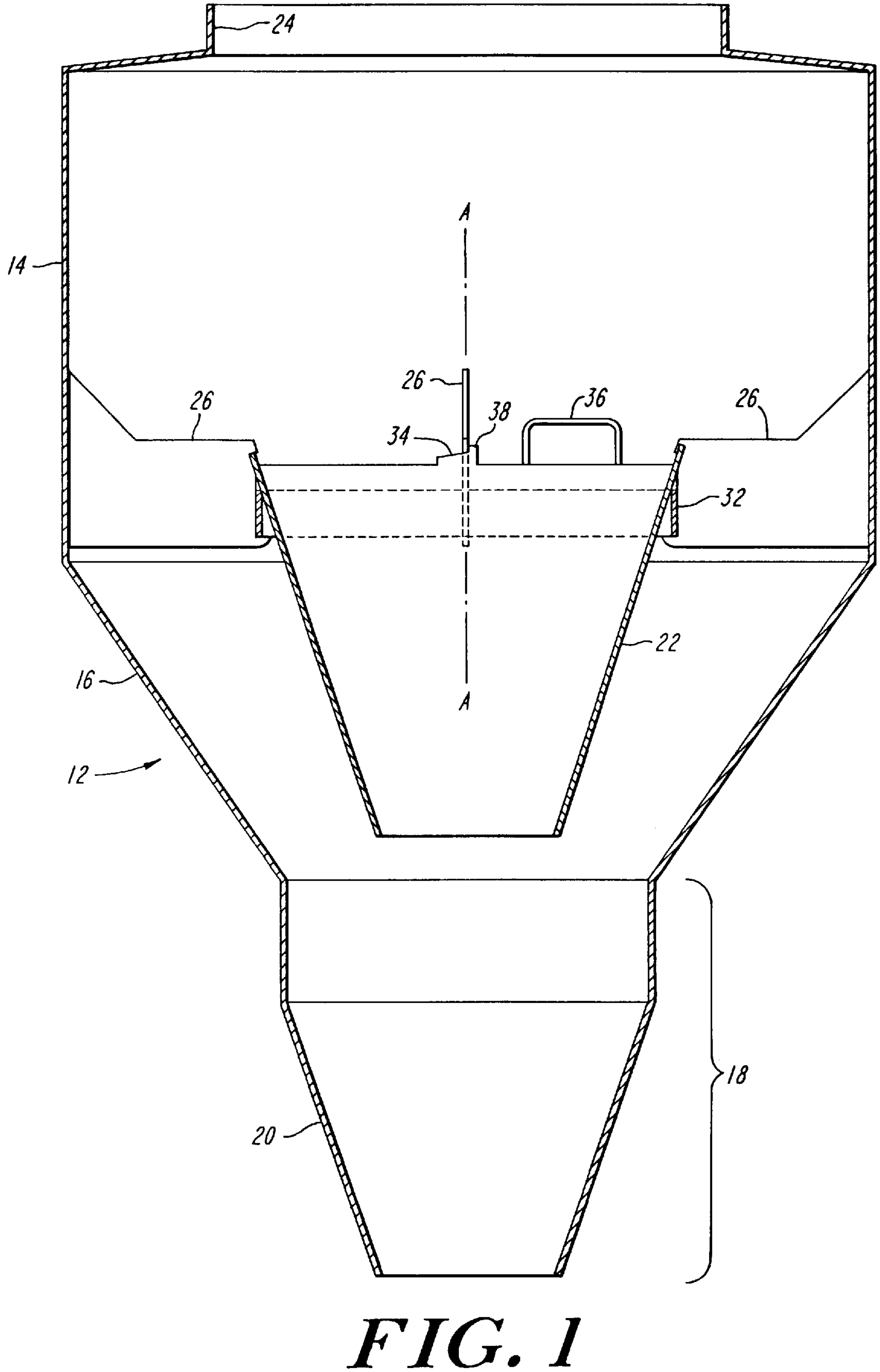
FIG. 1 is an elevation in section taken on the diameter of a bin having an assembly according to a first embodiment of the invention, the insert being shown in the fully installed position.
Figure 2:
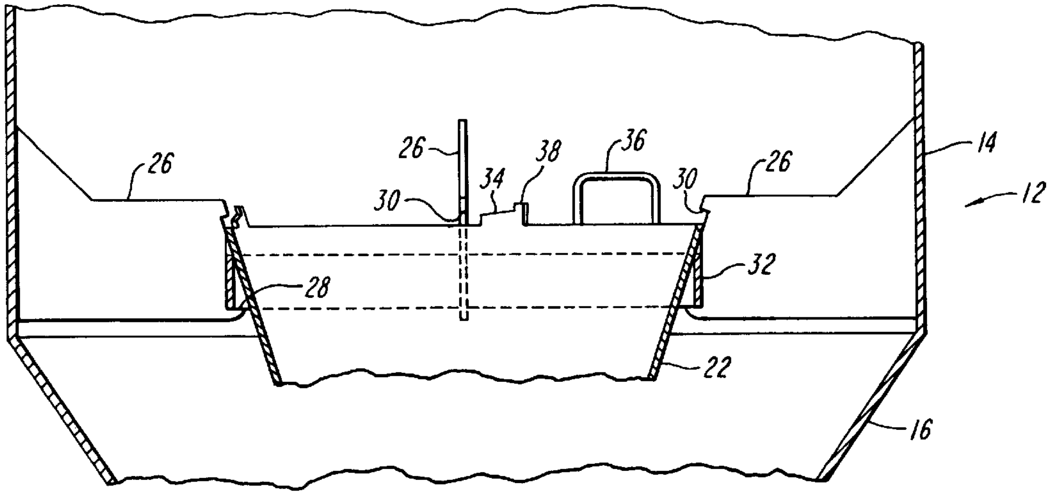
FIG. 2 is a detail elevation in section of the embodiment of FIG. 1 showing the insert in a partially installed position.
Figure 3:
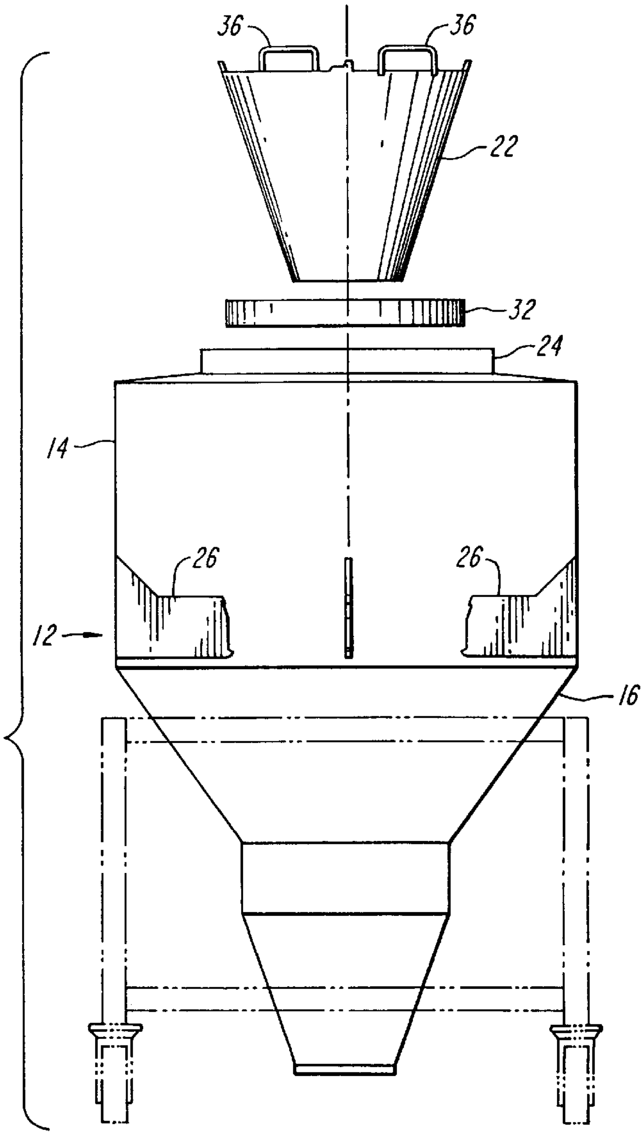
FIG. 3 is an exploded view of the embodiment of FIG. 1 illustrating the method of assembly.

FIGS. 1 to 3 illustrate a first embodiment of the invention. A bin 12 for particulate solids typically comprises a cylindrical upper section 14, a cone section 16 and a discharge section 18, the latter typically having a steep hopper 20 that easily satisfies the above described condition for mass flow. To achieve mass flow within the hopper section 16 when required, a conical insert 22 is provided. In this embodiment the upper section of the bin is cylindrical and the hoppers 16 and 20 as well as the insert 22 are of frustoconical shape. However, it will be apparent from the following description that the invention is not limited to such shapes. For example, the hopper walls and the insert may be of pyramidal shape or other shapes having sloping wall portions which in sectional elevation are similar to FIG. 1.

The bin 12 is formed with an opening 24 that is adequate in diameter for insertion and removal of the insert 22 as well as for filling with particulate solids.

A plurality of flat brackets 26, typically three or four in number, extend from the wall of the bin in annularly spaced arrangement and project inwardly toward the vertical axis A—A of the bin. The brackets may be either permanently or removably secured to the wall of the bin, the means of attachment being sufficient for rigidly holding each bracket with its nominal plane preferably vertical and radial to the axis A—A. Preferably, each bracket is formed of a flat, smooth sheet of metal with the inner edge formed to provide a notch 28 and a projection 30 whose functions are described below.

Another element of the assembly in this embodiment comprises a cylindrical ring 32 having a diameter such that it rests fittingly on the notches 28 of the brackets 26.

The insert 22 is of frustoconical shape, having an upper edge portion formed with a plurality of tapered projections 34 which are annularly spaced around the perimeter in the same manner as the brackets 26. For convenience of assembly a pair of bail-shaped handles 36 may be secured to the upper edge of the insert.

The insert 22 is assembled in the bin 12 by first inserting the ring 32 through the opening 24 and resting it upon the notches 28 of the brackets. Then, the insert 22 is lowered on to the ring so that it rests upon the upper edge thereof, the diameter at the upper extremity of the insert being sufficiently small to allow its passage between the inner extremities of the projections 30 on the brackets. It will be observed that the ring 32 functions not only as an annular support for the insert, but also as a means to retain its circular shape along its entire perimeter at the line of support.

Initially, the insert is placed on the ring 32 with its tapered projections 34 adjacent the projections 30 on the brackets as shown in FIG. 2. With the insert fully seated on the ring 32 it is rotated about the axis A—A to bring the tapered portions of the projections 34 under the projections 30 and in sliding contact therewith. The insert 22 is rotated until the projections 30 engage stop tabs 38 formed on the projections 34. In this position of the insert it is fully and vertically engaged between the projections 30 on the brackets and the perimeter of the ring 32.

Figure 4:
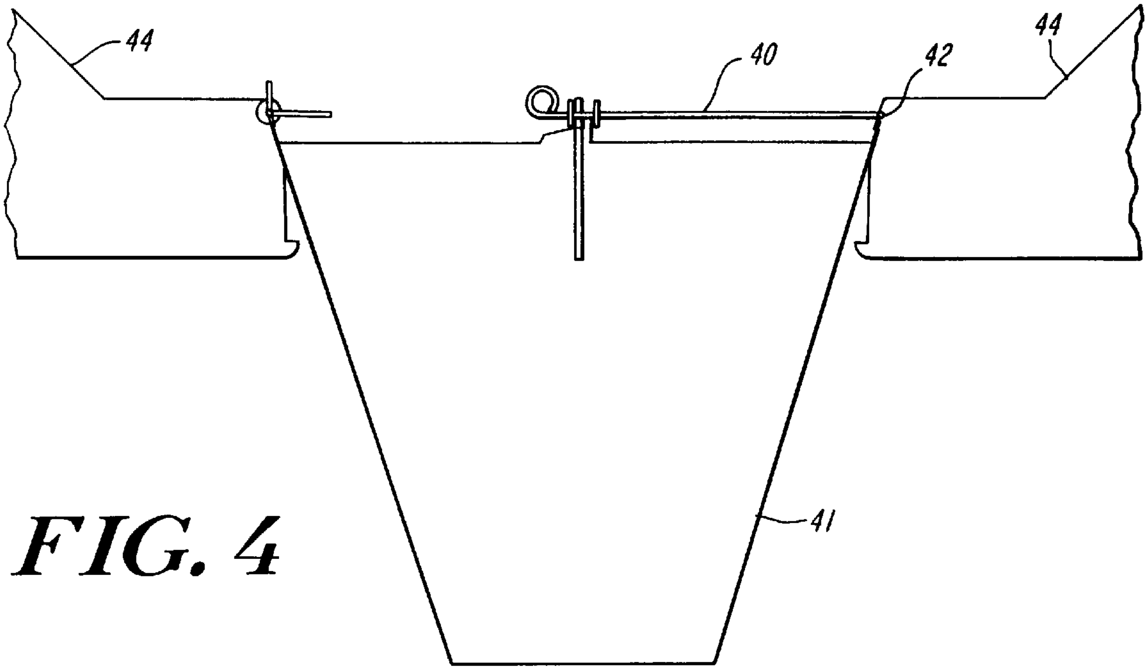
FIG. 4 is a partial elevation in section showing a second embodiment of the invention omitting the support ring and provided with a snap ring to prevent rotation of the insert out of the fully installed position.
Figure 6:
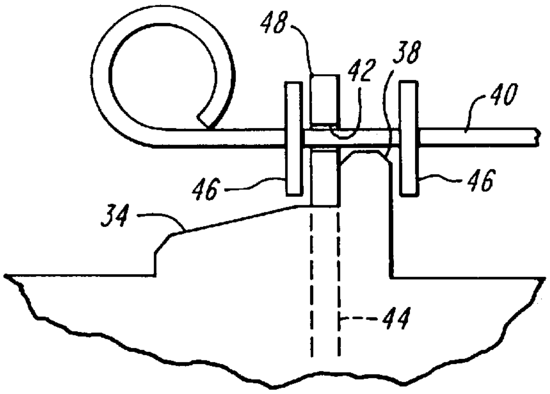
FIG. 6 is a detail elevation showing the locking washers on the snap ring.
Figure 5:
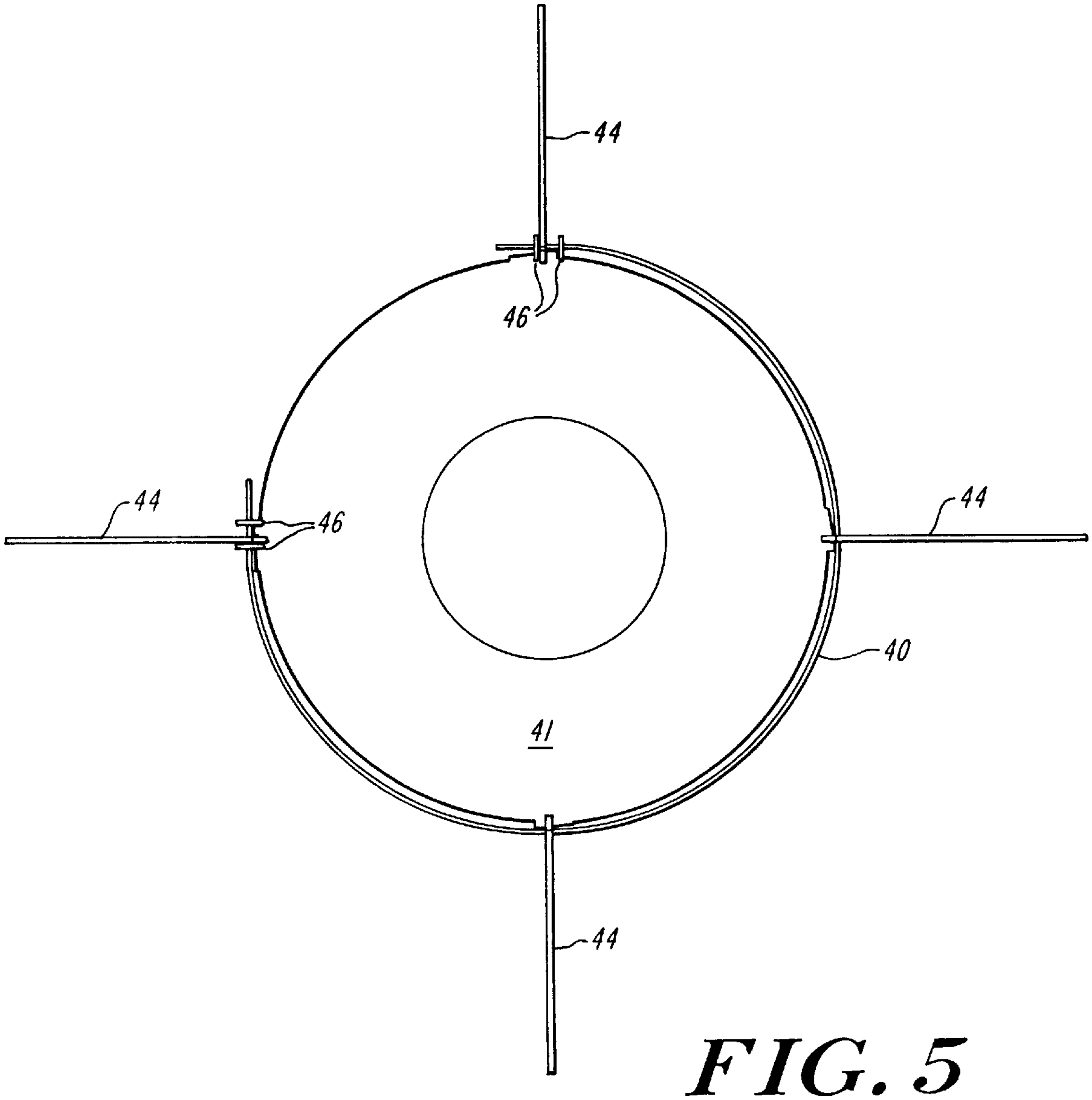
FIG. 5 is a plan view showing details of the snap ring.

FIGS. 4, 5 and 6 illustrate a second embodiment of the invention which includes a locking ring 40 preferably formed in a partial circle. The locking ring is formed of spring wire and adapted to snap into notches 42 formed in flat brackets 44 similar to the brackets 26 of FIGS. 1 to 3. The ends of the brackets 44 are formed with tapered edges upon which a conical insert 41 is rested.

Referring to FIG. 6, the locking ring has one or more pairs of washers 46 welded or otherwise permanently secured to the ring 40 mutually in spaced relationship. When the locking ring 40 is snapped into the recesses 42 on the brackets the washers 46 retain the stop tabs 38 of the projections 34 in firm contact with the respective projections 48 on the brackets 44. As shown, the locking ring 40 has pairs of washers 46 at each end, but one or more than two pairs may be provided if desired.

It will be noted that each of the embodiments described above may be quickly disassembled and removed from the bin 12 when not required for acceptable particulate material flow or when required for periodic cleaning. When disassembled the components are all readily cleanable with substantially no more difficulty or lack of access or inspection than for a simple hopper having no insert components. Thus the apparatus of the invention is particularly well suited for pharmaceutical processing applications where contamination of succeeding batches is to be avoided. Since the brackets are preferably perfectly flat there is greatly improved access for cleaning and visual inspection. Similarly, the support ring 32 and the insert 22 or 41 are of simple cylindrical or frustoconical shape, thus facilitating cleaning operations.

It will also be apparent from the above description that the brackets 26 of FIGS. 1 to 3 may be modified to include recesses similar to the recesses 42 of FIGS. 4 to 6, and a locking ring as described in the latter figures may be added to the assembly of FIGS. 1 to 3 for a similar purpose.

What is claimed is:

1. An assembly for the processing of particulate solids comprising, in combination, a container for particulate material having a wall, a plurality of upwardly extending flat brackets supported on the wall in annularly spaced arrangement and projecting from the inner surface thereof toward a vertical axis, the brackets having notches formed on the inner edges thereof, a cylindrical support ring resting on the notches, and an insert having a frustoconical upper edge portion resting on the ring, said edge portion being formed with a plurality of tapered projections, the brackets having projections formed on inner edges thereof and vertically engageable with the tapered projections on the insert upon rotation thereof relative to the brackets.

2. An assembly according to claim 1, in which the container has inwardly sloping walls.

3. An assembly according to claim 1, in which the brackets have nominal planar surfaces which are vertical.

4. An assembly according to claim 1, in which the container and insert have opposing frustoconical walls.

5. An assembly according to claim 4, in which the slope of the insert relative to the vertical and the difference between the slopes of the container and the insert relative to the vertical are less than the critical mass flow angle for the solids.

6. An assembly according to claim 1, including a locking ring substantially conforming in shape to the support ring and having locking washer means projecting therefrom, the washer means being adapted to engage the projections on the brackets and insert respectively to prevent relative rotation thereof.

7. An assembly according to claim 6, in which the brackets have recesses for retention of the locking ring.

8. An assembly for the processing of the particulate solids comprising, in combination, a container for particulate material having a wall, a plurality of upwardly extending flat brackets supported on the wall in annularly spaced relationship and projecting from the inner surface thereof toward a vertical axis, an insert having a frustoconical upper edge portion formed with a plurality of tapered projections, the brackets having projections formed on inner edges thereof and vertically engageable with the tapered projections on the insert upon rotation thereof relative to the brackets.

9. An assembly according to claim 8, in which the container has inwardly sloping walls.

10. An assembly according to claim 8, in which the brackets have nominal planar surfaces which are vertical.

11. An assembly according to claim 8, in which the container and insert have opposing frustoconical walls.

12. An assembly according to claim 11, in which the slope of the insert relative to the vertical and the difference between the slopes of the container and the insert relative to the vertical are less than the critical mass flow angle for the solids.

13. An assembly according to claim 8, including a locking ring having locking washer means projecting therefrom, the washer means being adapted to engage the projections on the brackets and insert respectively to prevent relative rotation thereof.

14. An assembly according to claim 13, in which the brackets have recesses for retention of the locking ring.

* * * * *